United States Patent Office 3,171,943
Patented Mar. 2, 1965

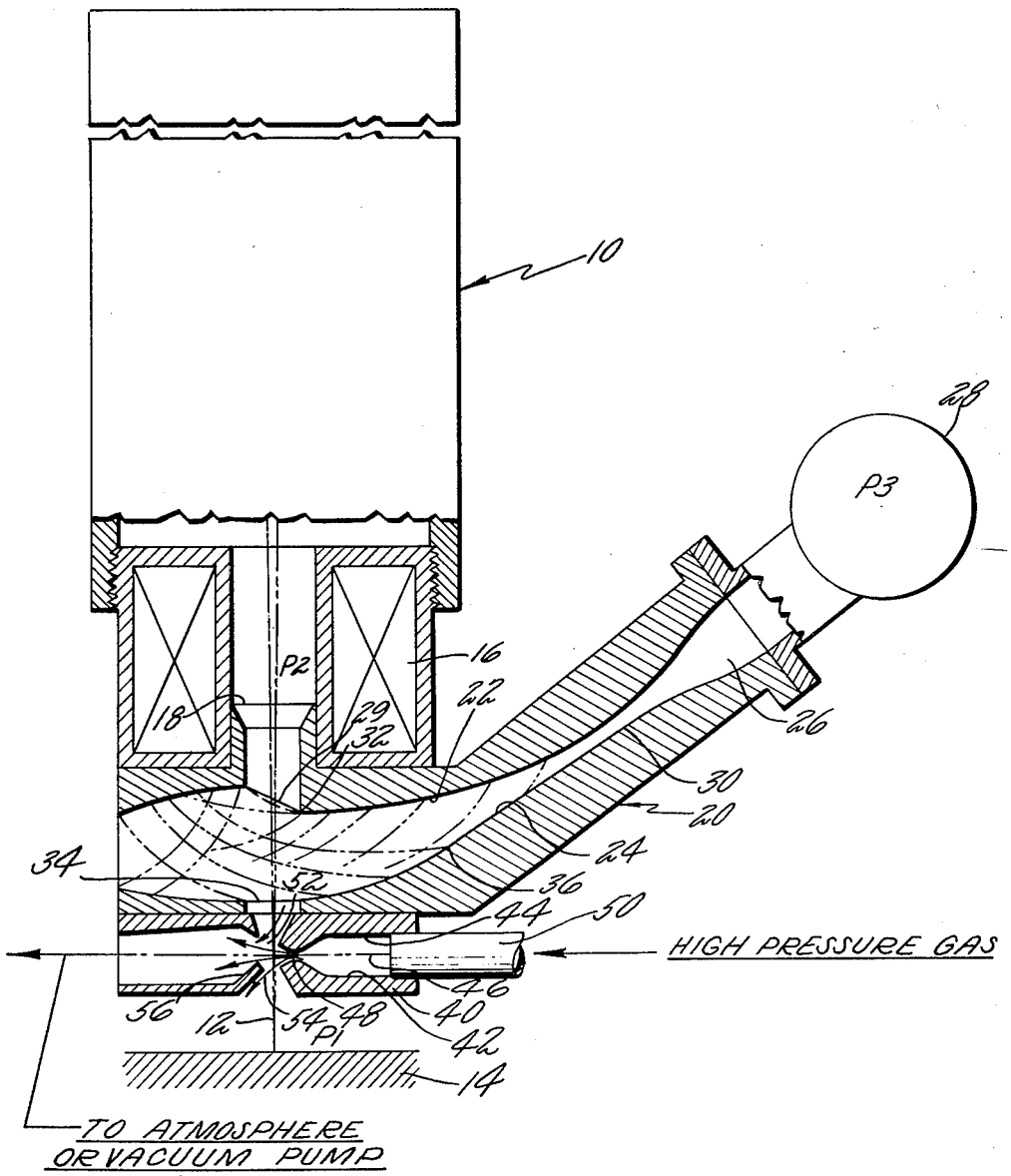

3,171,943
VAPOR DEFLECTOR FOR ELECTRON
BEAM MACHINE
Robert M. Niedzielski, Thompsonville, Conn., assignor to
United Aircraft Corporation, East Hartford, Conn., a
corporation of Delaware
Filed Nov. 26, 1963, Ser. No. 325,929
4 Claims. (Cl. 219—121)

This invention relates to the working of materials with a beam of charged particles. More particularly, this invention relates to performing operations such as welding, cutting, melting, evaporating, or machining on any material with an electron beam.

Devices which use the kinetic energy of an electron beam to work a material are presently commercially available. Such devices are generally known as electron beam machines. U.S. Patent No. 2,987,610, issued June 6, 1961, to K. H. Steigerwald, discloses such a machine. These machines operate by generating a highly focused beam of electrons. The electron beam is a welding, cutting and machining tool which has practically no mass but has high kinetic energy due to the fact that high momentum is imparted to the electrons. Transfer of this kinetic energy to the lattice electrons of the workpiece generates higher lattice vibrations which cause an increase in the temperature within the impingement area sufficient to accomplish work. To achieve the deep penetration of the electron beam into the work shown and discussed in the above-mentioned Steigerwald patent, it is necessary that the temperature of the workpiece at the beam impingement point become so great that at least a portion of the material vaporizes. That is, deep penetration can be achieved only by at least a partial vaporization of the workpiece.

Among the advantages of using an electron beam or the like are inertialess control and great energy concentration. However, until recently, these advantages were somewhat offset by the fact that electron beam operations had to be performed in an evacuated chamber. Working in the absence of gas was considered necessary for several reasons. First, any gas in the region surrounding the material being worked may be absorbed by and thus tend to cause impurities or irregularities in the workpiece. Secondly, and more important, the presence of gas causes scattering and attenuation of the electron beam thereby preventing the precise focusing and high power density necessary to accomplish work at one spot without material adjacent thereto being affected through heat conductivity. This scattering problem is further aggravated by the cloud of vaporized material emanating from the workpiece. Thirdly, operating an electron emitter in a vacuum of less than $10^{-4}$ Torr improves arc over characteristics and increases filament life.

As noted above, the foregoing problems formerly dictated that the working of material with a beam of charged particles be performed in an evacuated chamber. This approach, however, entailed an obvious disadvantage in that the size of the piece that could be worked with the beam was limited by the size of the chamber. For smaller parts, this restriction is acceptable but inconvenient. For extremely large parts, the cost of the vacuum chamber and associated pumps is so expensive that the process generally becomes economically unfeasible. Accompanying this problem is the inconvenience inherent in the time consuming task of pumping down the work chamber after each new workpiece is inserted therein.

It became apparent to those skilled in the art that, in cases where contamination of the workpiece was not an extremely critical problem, means should be found to bring the electron beam out of the evacuated container in which it must be generated in order to overcome the above-mentioned problems and disadvantages. To accomplish the foregoing, various schemes have been proposed and, in some cases, utilized. However, these prior art methods have, with a single exception, met with little success since they still result in excessive attenuation of the beam at the relatively high energy concentrations required for working materials. Examples of such unsuccessful prior art approaches may be found in U.S. Patents No. 2,640,948; 2,816,231; 2,824,232; and 2,899,556. In most of the prior art approaches, the beam exits to the workpiece through a small aperture. From an economic standpoint, the beam exit aperture must be small in order to minimize leakage of gas into the beam generator region thereby minimizing the size and corresponding cost of the necessary vacuum pumping apparatus. Also, the beam exit aperture must, in order to minimize attenuation or the length of the path which the beam must travel through a gaseous atmosphere, be positioned relatively close to the work. As a result of the extremely high power densities involved in welding, cutting, melting, evaporating or machining any material with a beam of charged particles, both vapors and splatter emanate from the beam impingement point on the workpiece. These particles and vapors tend to collect at and thus cause rapid clogging of the small, adjacently located beam exit aperture.

This invention overcomes the above-described clogging problem by providing a novel self-cleaning beam exit aperture system which may be utilized with any of the prior art methods for transmitting a beam of charged particles from a low to a high pressure region.

It is therefore an object of this invention to work materials in a gaseous atmosphere with a beam of charged particles.

It is also an object of this invention to prevent clogging of an opening through which a beam of charged particles is directed at a workpiece.

It is another object of this invention to provide a protective blanket of inert gas for materials being worked with a beam of charged particles.

These and other objects of this invention are accomplished by directing a stream of gas across a beam exit aperture in such a manner that vapors and splatter emanating from the beam impingement point on the work will be washed away from said aperture and the work will be blanketed by such gas.

This invention may be better understood and its numerous advantages will become apparent to those skilled in the art by reference to the accompanying drawing. In the drawing, reference numeral 10 indicates an electron beam generator. For a complete disclosure of a state of the art electron beam generator of the type being employed in commercially available welding and cutting machines and typical of those with which this invention is intended for use, reference is made to above-mentioned Steigerwald U.S. Patent No. 2,987,610. It is an object of this invention to obviate the necessity of utilizing an evacuated work chamber, such as chamber 24 of FIGURE 1 of the Steigerwald patent, when working materials with an intense beam of charged particles. As is well known in the art and as shown by the Steigerwald patent, beam generator or column 10 contains means, not shown, for emitting electrons, focusing the electrons into a beam and accelerating the beam toward a workpiece. The beam formed in column 10 is indicated at 12. The workpiece, which may be two flat plates to be joined by a butt weld, is shown at 14. Workpiece 14 will, in the usual case, be in the atmosphere or a region of relatively high pressure, P1. Column 10 is evacuated and maintained at a low pressure, P2, by vacuum pumping means, not shown, of any type well known in the art. The beam generated in column 10 is focused at the workpiece by a magnetic lens assembly 16 which is supplied with current from a variable current supply, not shown. The electron beam is accelerated down column 10 and exits therefrom through an opening 18.

While not limited to use therewith, this invention will be explained in connection with the most successful prior art method of transmitting an unattenuated beam of particles out of an evacuated chamber without excessive leakage of environmental gases into said chamber. This method is known as the cross-flow orifice system and is the subject of copending application Serial No. 235,214, filed November 5, 1962, now Patent No. 3,156,811, by Frank W. Barry and assigned to the same assignee as the present invention. In the crossflow orifice system, a housing or passageway defining means 20 comprising internally opposed wall surfaces 22 and 24 is interposed between workpiece 14 and column 10. The surfaces 22 and 24 are arranged with respect to the axis of beam 12 so as to define a gas supply passageway 26 thereto. The inlet end of passageway 26 is connected to a source of sealing gas 28 which, in the usual case, contains an inert gas such as dry nitrogen under pressure, P3. Passageway 26 terminates in a beam chamber having a beam passage aperture 29, which aperture is aligned with opening 18, in the top thereof.

In order to insure that there will be no leakage of either the sealing gas from source 28 or the environmental gas surrounding workpiece 14 into the beam generator 10, it is necessary that the pressure of the sealing gas in the region of beam passage aperture 29 in wall 22 be extremely low or, restated, this pressure should be equal to the pressure maintained at opening 18 by the vacuum pumps. In order to achieve this low pressure, a nozzle is employed to increase the velocity of the stream of sealing gas. Thus, the wall surfaces 22 and 24 cooperate to define convergent and divergent sections of a supersonic nozzle with a throat 30 therebetween. The pressure of source 28 is sufficient to provide for supersonic flow in the divergent passageway section downstream of throat 30 and across aperture 29. As shown, the discharge stream is orientated generally transversely with respect to the axis of beam 12 to provide a gaseous seal across aperture 29 and thus to prevent leakage of gas into generator 10.

As a result of the supersonic flow phenomenon produced by the expansion surface or diverging portion of upper wall 22 downstream of throat 30 and the compression surface or substantially convergent portion of lower wall 24 downstream of throat 30, the flow cross-section along the axis of beam 12 will be as follows: Expansion waves emanating from the surface 22 and particularly from adjacent the upstream lip 32 of aperture 29 provide a continually decreasing pressure region in a downstream direction or right to left as shown in the drawing. Thus the beam initially penetrates the cross flow of sealing gas in an area which is at a pressure not substantially higher than P2 or that existing in the region of opening 18 which, as stated above, is maintained at a relatively low pressure by vacuum pumps. For the foregoing reasons and since, as is well known, a fluid flowing at supersonic velocity has difficulty following sharp expansion surfaces or corners such as that presented by the upstream lip 32 of aperture 29, there will be little flow upwardly into the evacuated beam generator. The foregoing phenomenon is explained in U.S. Patent No. 2,811,828, issued to G. H. McLafferty, on November 5, 1957. Progressing downwardly along the axis beam 12 from aperture 29 to the region of a beam exit aperture 34, which aperture is defined by wall 24 and downstream member 38 and is aligned with aperture 29, the pressure will on the average progressively increase. A relatively high pressure in the region of aperture 34 results from the continued increase of pressure in the cross-flow stream due to the shock waves formed on and moving from left to right from junction point 36 on wall 24 across aperture 34. The relatively high pressure in the region of aperture 34 caused by these shock waves will prevent gas from without the casing from flowing upwardly through aperture 34. For a more detailed explanation of the operation and design of the cross-flow orifice system, reference may be had to copending Barry application Serial No. 235,214, now Patent No. 3,156,811, and particularly to the explanation of FIGURE 1 thereof.

In the working of materials with a high intensity beam of charged particles it has been found that the aperture through which the beam of charged particles exits to the relatively high pressure workpiece region tends to become clogged by vapors and particles rising from the material being worked. This is true even with the cross-flow orifice system which exhibits an inherent self-cleaning effect. Thus, it became necessary to devise means to deflect debris away from the beam exit opening, such as aperture 34, without substantially increasing the possibility of collision between electrons in the beam and gas molecules or, in the case of the cross-flow orifice, without adversely affecting the expansion and compression wave pattern within the stream of sealing gas. In accordance with this invention, the foregoing is accomplished by utilizing a second stream of gas traveling at an angle to the electron beam. This secondary stream of gas is directed at an angle to the beam axis at a point between the beam exit aperture 34 and workpiece 14 and deflects vapors and particles from the workpiece away from said aperture.

To achieve the aforementioned secondary stream of gas flow, a second housing or passageway defining means 40 is positioned between housing means 20 and workpiece 14. Passageway defining means 40 comprises a pair of internally opposed wall surfaces 42 and 44 which define a gas supply passageway 46. In the preferred embodiment of this invention, wall surfaces 42 and 44 converge to form a nozzle with a throat 48. Thus, when gas from a source at sufficient pressure is passed through passageway 46, supersonic flow will occur downstream of throat 48. The inlet end of passageway 46 is connected by a hose or tubing 50 to a source of gas which, in the usual case, contains an inert gas under pressure. Tubing 50 may be connected to source 28 or to a separate source of gas. For best results, the gases in both the cross-flow orifice and the secondary streams should be light-weight inert gases. Use of an inert gas in the secondary stream will result in the above-described beneficial blanketing of the work in a protective atmosphere. However, it is not necessary to use the same gas and, in the interest of economy, dry nitrogen may be pumped through the cross-flow orifice system and collected downstream of the beam axis for reuse while air might be pumped through passageway 46.

The beam exiting from aperture 34 will serially pass through aligned apertures 52 and 54 in the upper and lower walls of passageway defining means 40. In so doing, the beam will pass through the stream of secondary gas. Due to the relatively high pressure in the cross-flow orifice at aperture 34, none of the gas in the secondary stream will pass upwardly along the beam axis. Should the velocity of the secondary gas be supersonic in the region between apertures 52 and 54, the inability of the gas to follow the sharp expansion surface presented by the upstream lip of aperture 52 will also serve to prevent leakage of such gas upwardly along the beam axis. For this reason, when the instant invention is used with prior art schemes such as the pressure stretch stage described in U.S. Patent No. 2,640,948, it is desirable, but not mandatory, to cause supersonic flow of the secondary gas. It must be noted, however, that the instant invention has utility when the velocity of the secondary gas is subsonic. To achieve subsonic velocity, wall surfaces 42 and 44 are straightened to eliminate throat 48.

The downstream lip 56 of aperture 54 projects into the stream of secondary gas and thus functions as a flow splitter. As is well known in the art, the use of the flow splitter causes some of the gas flowing in passageway 46 to be diverted outwardly through aperture 54. That is, lip 56 functions as an obstruction in the path of the secondary gas stream and thus, while serving to define the exit aperture 54, also acts to divert a portion of the fluid stream from its normal flow path. By varying the angle of attack and position of lip 56, the amounts and direction of the gas flowing outwardly through aperture 54 may be controlled. The secondary gas which passes out through aperture 54 while traveling at an angle to the electron beam will deflect vapors and particles rising from the workpiece and will thus keep them from clogging apertures 34, 52 and 54.

As will be obvious from the foregoing description, the present invention permits the working of materials in a gaseous atmosphere with a beam of charged particles and overcomes the problem of clogging of the beam exit aperture. While a preferred embodiment thereof has been shown and described, various modifications and substitutions may be made without deviating from the spirit and scope of this invention. For example, the angle at which the secondary gas crosses the beam axis can be varied from horizontal, as shown, to close to vertical. Also, more than one nozzle can be employed at the same time so as to inject the secondary gas across the beam axis from more than one direction. Further, the flow divider element may take various forms and may be positioned at various locations within the secondary gas passageway. Similarly, the cross section of the secondary gas passageway may be round or square. Also, as noted above, this invention may be utilized with any device which generates a beam of charged particles in a low pressure region and uses such beam to work a material in a region of relatively high pressure. Thus, this invention is described by way of illustration rather than limitation and accordingly, it is understood that this invention is to be limited only by the appended claims taken in view of the prior art.

I claim:
1. Apparatus for working materials with an intense beam of charged particles comprising:
   means for generating a beam of charged particles, said beam having an axis;
   an evacuated vessel containing at least a portion of said beam generating means, said vessel defining an opening for transmission of said beam;
   means for directing the beam out of said vessel through said opening so that the beam may impinge on a material to be worked located outside of said vessel in a gaseous environment;
   means positioned adjacent said vessel opening for preventing leakage of the environmental gas from the region of the material to be worked into said evacuated vessel, said leakage preventing means permitting passage of said beam without material attenuation thereof;
   a source of gas under pressure; and
   means for deflecting particles and vapors emanating from the point of impingement of the beam on the material to be worked away from the beam axis whereby passage of the beam through said vessel opening and said leakage preventing means will not be substantially impeded by said particles and vapors, said deflecting means defining a gas supply passageway connected at its inlet end to said source of gas and having its outlet end positioned so as to discharge a stream of gas across and at an angle to the axis of the beam in a region lying along said axis between said leakage preventing means and the material to be worked, at least some of the gas flowing through the passageway being directed into the gaseous environment surrounding the material to be worked.

2. The apparatus of claim 1 wherein the passageway defining means comprises:
   inner and outer wall surfaces which cooperate to define a nozzle therebetween, the pressure of said source being sufficient to produce supersonic flow of said passageway gas downstream of said nozzle.

3. The apparatus of claim 1 further comprising:
   means for splitting the stream of gas to thereby divert a portion thereof generally toward the surface of the material being worked.

4. The apparatus of claim 1 further comprising:
   means aligned with the discharge end of said passageway defining means for diverting a portion of the gas stream generally toward the surface of the material being worked.

References Cited by the Examiner
UNITED STATES PATENTS 2,824,232 2/58 Steigerwald.
2,954,968 10/60 Vedder _____ 98—36

RICHARD M. WOOD, *Primary Examiner.*

JOSEPH V. TRUHE, *Examiner.*